United States Patent [19]

Nuimura

[11] Patent Number: 4,814,882
[45] Date of Patent: Mar. 21, 1989

[54] MONITOR TELEVISION APPARATUS
[75] Inventor: Yoshimi Nuimura, Gyoda, Japan
[73] Assignee: Kabushiki Kaisha Toshiba, Kawasaki, Japan
[21] Appl. No.: 101,244
[22] Filed: Sep. 25, 1987
[30] Foreign Application Priority Data Sep. 30, 1986 [JP] Japan ................... 61-232294

[51] Int. Cl.$^4$ .................. H04N 5/262; H04N 5/18
[52] U.S. Cl. ................... 358/181; 358/22; 358/172; 455/276
[58] Field of Search ............ 358/905, 172, 176, 177, 358/178, 181, 22; 455/276, 277, 278, 273, 134, 132

[56] References Cited

U.S. PATENT DOCUMENTS

| | | | |
|---|---|---|---|
| 4,489,344 | 12/1984 | Okeda et al. | 358/27 |
| 4,578,698 | 3/1986 | Miki et al. | 358/22 |
| 4,578,819 | 3/1986 | Shimizu | 455/277 |
| 4,602,169 | 7/1986 | Shimizu | 455/134 |
| 4,612,577 | 9/1986 | Keen | 358/172 |
| 4,660,085 | 4/1987 | Harwood et al. | 358/171 |
| 4,729,026 | 3/1988 | Suzuki et al. | 358/172 |

OTHER PUBLICATIONS

IEEE Development of the TV Receiver for Cars-Yashima, Kenishi, et al.-Aug. 1982-vol. CE-28, No. 3, pp. 437-446.

Primary Examiner—James J. Groody
Assistant Examiner—John K. Peng
Attorney, Agent, or Firm—Cushman, Darby & Cushman

[57] ABSTRACT

A composite video signal from a television tuner which performs a diversity function is input to a demodulator which performs signal processing such as reproduction of a DC component through clamping of the pedestal level and a color demodulation. The composite video signal is also input to a deflection circuit which produces a horizontal sync pulse and a vertical blanking pulse from the received composite video signal. The horizontal sync pulse from the deflection circuit is supplied to a phase shifter/switching circuit which generates a clamp pulse. The clamp pulse is supplied to the demodulator and used for the pedestal clamping operation. The phase shifter/switching circuit also receives the vertical blanking pulse from the deflection circuit to stop the pedestal clamping operation of the demodulator. That is, the generation of the clamp pulse is stopped while the vertical blanking pulse is input to the phase shifter/switching circuit.

17 Claims, 4 Drawing Sheets

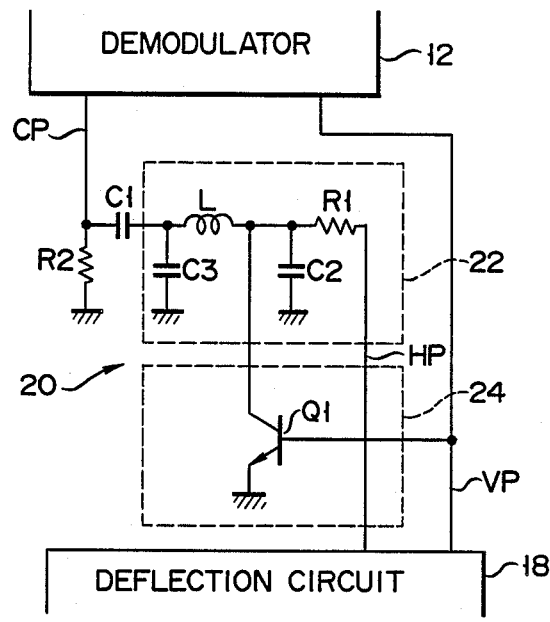
F I G. 3
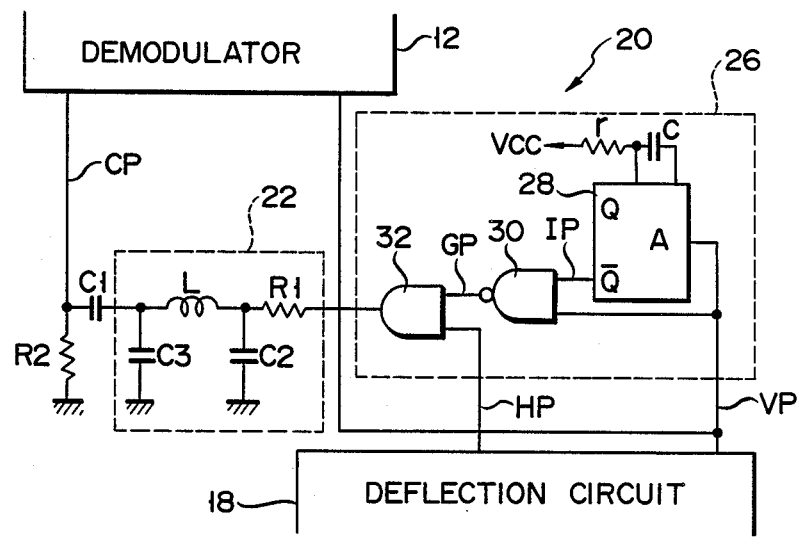
F I G. 4

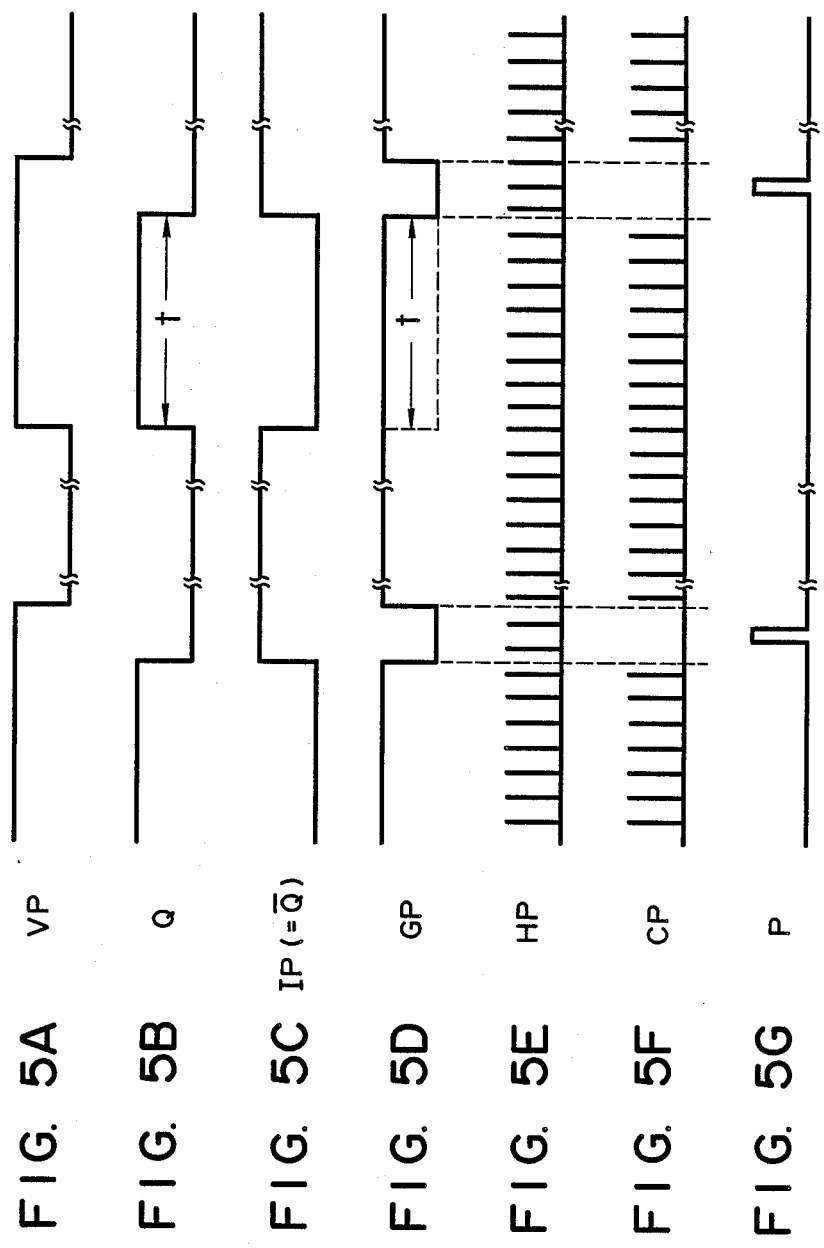

MONITOR TELEVISION APPARATUS

BACKGROUND OF THE INVENTION

The present invention relates to a monitor television apparatus and, in particular, to a monitor television apparatus which executes a diversity reception technique using a plurality of antennas.

A diversity reception system using a plurality of antennas is known as one of the techniques to receive television (TV) signals while reducing the fading influence. In a TV reception system employing this diversity reception system, a TV tuner performs the diversity function for each vertical blanking period and outputs a composite video signal, using n antennas.

More specifically, after a lapse of a given time after a vertical sync signal falls, an antenna switching pulse is generated to instantly switch from the presently selected antenna to another one, which changes the level of a received signal. This changed level is compared with the previous level, and if it is smaller than the previous one, the antenna is switched to the previous antenna. On the other hand, if the changed level is greater than the previous one, the selected antenna is retained for signal reception.

The antenna is again switched to another one by the next switching pulse that is generated after one vertical period, and the signal level comparison is similarly performed. When the difference in level between the signals before and after the antenna switching is large, a large pulse appears in the composite video signal in synchronism with the switching pulse.

The composite video signal generated after video signal detection by the TV tuner is input to a demodulator of the monitor TV apparatus. The demodulator reproduces a DC component originated from the clamping of the pedestal level and performs a signal processing such as color demodulation, so as to provide the primary color signals, red (R), green (G), and blue (B) signals. Each primary signal is amplified by its associated video amplifier.

The composite video signal is also supplied to a deflection circuit of the monitor TV apparatus, which separates sync signals from the video signal, and supplies a horizontal sync signal to a phase shifter while supplying a proper blanking pulse to the demodulator. The phase shifter shifts the phase of the horizontal sync pulse to generate a clamp signal in phase with a color burst signal and supplies the clamp signal to the demodulator. The deflection circuit supplies a deflection output to drive a color cathode ray tube (CRT) which receives the amplified R, G, and B color signals to display a color image.

When the antenna switching pulse is out of phase with the clamp pulse, no trouble occurs. When these pulses are in phase, however, an undesirable pulse appears in the composite video signal in synchronism with the switching pulse, as mentioned above, and is superimposed on the clamp pulse. Since the demodulator of the monitor TV apparatus clamps the composite video signal to reproduce the DC component, the primary color signals demodulated after the clamping each have a sag portion that is deflected significantly from a normal pedestal clamp pulse. As the restoration of the sag continues over the vertical scanning period, a brightness change occurs at the upper portion on the display screen which corresponds to the beginning of the vertical scanning period.

SUMMARY OF THE INVENTION

With the above situation in mind, it is an object of this invention to provide a monitor television apparatus which prevents a brightness change from occurring on the display screen even when receiving a video signal including a switching pulse at the time the diversity reception is performed by switching between a plurality of antennas.

To realize this object, the monitor television apparatus of this invention comprises:

clamp pulse generating means for receiving a composite video signal from a television tuner that performs diversity reception and for generating a clamp pulse used for clamping of the pedestal level a of the composite video signal, the diversity reception being such that a plurality of antennas are switched by a switching pulse produced in each vertical blanking period to select that antenna which maximizes the level of an input television signal;

signal processing means for receiving the composite video signal and the clamp pulse, for demodulating the composite video signal, and for pedestal-clamping the demodulated video signal using the clamp pulse to reproduce a direct current component, thereby providing a predetermined video signal;

display means for receiving and displaying the predetermined video signal as a video image; and control means for controlling the supply of the clamp pulse from said clamp pulse generating means to said processing means, said control means stopping the supply of the clamp pulse while the switching pulse is being output.

BRIEF DESCRIPTION OF THE DRAWINGS

FIG. 3 is a circuit diagram showing an example of a practical circuit arrangement of a phase shifter/switching circuit of the monitor television apparatus shown in FIG. 1;

FIG. 4 is a circuit diagram showing another example of the practical circuit arrangement of the phase shifter/switching circuit; and FIGS. 5A to 5G are timing charts for explaining the operation of the switching circuit of FIG. 4.

DETAILED DESCRIPTION OF THE PREFERRED EMBODIMENT

An embodiment of this invention will now be explained referring to the accompanying drawings.

Figure 1:
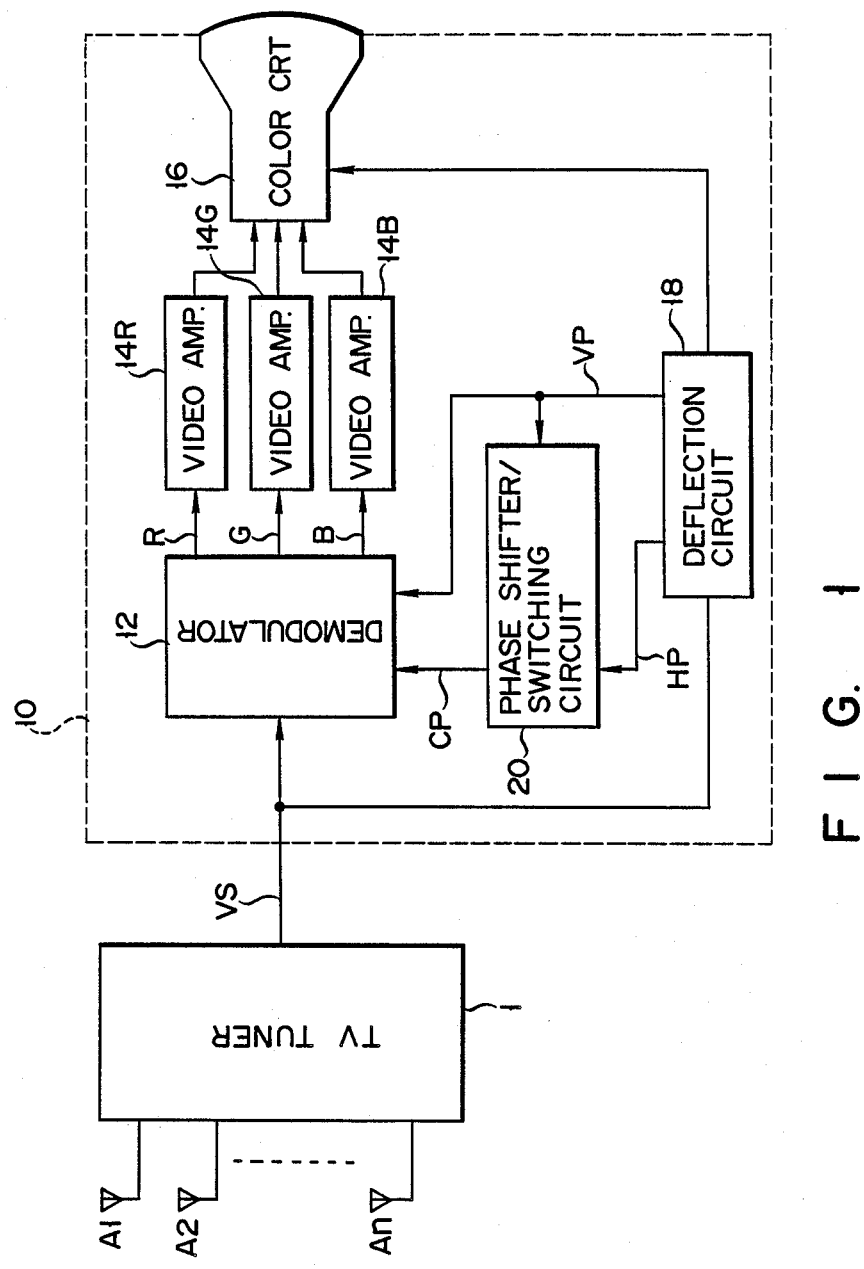
FIG. 1 is a block diagram of a monitor television apparatus according to an embodiment of this invention.
Figure 2:
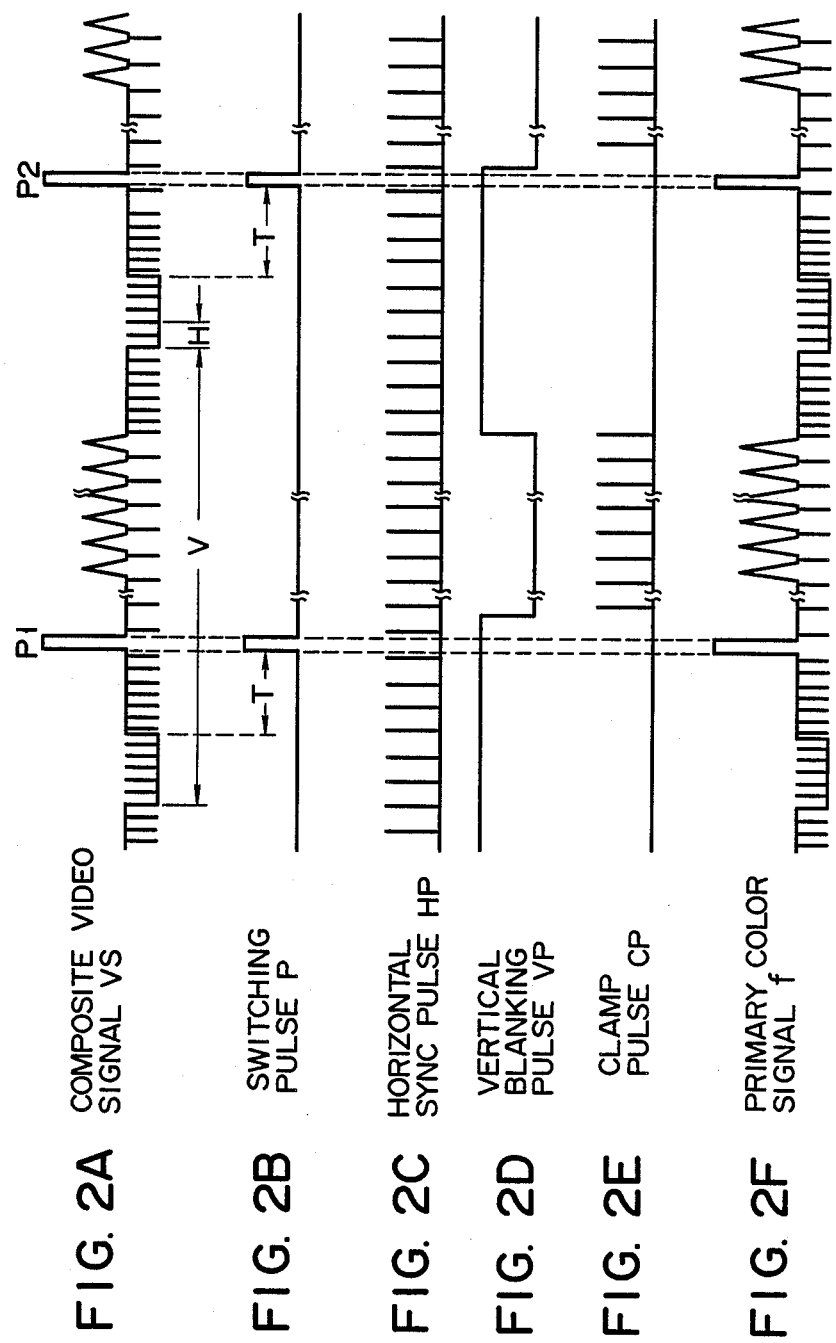
FIGS. 2A to 2F are timing charts for explaining the operation of the monitor television apparatus of FIG. 1.

FIG. 1 illustrates a diversity reception system that includes monitor television (TV) apparatus 10 of this invention. Monitor TV apparatus 10 receives a composite video signal VS as shown in FIG. 2A, from TV tuner 1 that performs the diversity reception.

In this case, TV tuner 1 is selectively coupled to a plurality of antennas A1, A2, ..., and An. To perform the diversity operation during a vertical blanking period, T tuner 1 generates antenna switching pulse P (see FIG. 2B) after a lapse of a given time T after a vertical sync signal falls, and instantly switches from the antenna Ai (i=1, ..., n) currently selected and in use to another antenna Aj (j≠i). The level of the input signal from the switched antenna Aj is compared with the level of the signal from the previously selected antenna Ai. When the level of the present signal is smaller than that of the previous signal, the antenna is switched back to the previous antenna Ai, and when otherwise, the switched antenna Aj is retained. Then after one vertical period V, the antenna switching is executed again by switching pulse P at the same timing, the levels of the input signals before and after the switching are compared, and the antenna selection is controlled on the basis of the comparison result.

In the above manner, TV tuner 1 executes the switching of the antennas for every vertical period and selectively uses the antenna that provides an input signal with the maximum level. The input signal received from that antenna is subjected to a video detection to provide a composite video signal VS. When there is a difference in input level between the signals received before and after the antenna is switched by switching pulse P, pulses as indicated by P1 and P2 in FIG. 2A are mixed into composite video signal VS.

In monitor TV apparatus 10 which receives such a composite video signal VS, video signal VS is input to demodulator 12, which demodulates it to produce primary color signals: red (R), green (G), and blue (B) signals. These primary color signals are supplied to video amplifiers 14R, 14G, and 14B, respectively, which amplify the signals to provide color signals suitable for driving color CRT 16.

Composite video signal VS received by monitor TV apparatus 10 is also supplied to deflection circuit 18, which separates sync signals from the received video signal VS and produces horizontal sync pulse HP (FIG. 2C) and vertical blanking pulse VP (FIG. 2D). Deflection circuit 18 also outputs a deflection signal to color CRT 16.

Horizontal sync pulse HP from deflection circuit 18 is supplied to phase shifter/switching circuit 20. The phase shifter in circuit 20 delays the phase of the input horizontal sync pulse HP to produce a clamp pulse CP which is in phase with the color burst. Deflection circuit 18 and phase shifter in circuit 20 operate as clamp pulse generating means. Clamp pulse CP is input to demodulator 12. Vertical sync pulse VP from deflection circuit 18 is input to demodulator 12 and phase shifter/switching circuit 20. To be specific, switching circuit in circuit 20 stops the pedestal clamping operation of demodulator 12 by the input vertical blanking pulse VP. In other words, the output of clamp pulse CP is stopped while vertical blanking pulse VP is being input. Switching circuit in circuit 20 operates as control means for controlling the supply for the clamp pulse CP from the clamp pulse generating means, which comprises deflection circuit 18 and phase shifter 22, to demodulator 12.

FIG. 3 illustrates a practical example of phase shifter/switching circuit 20. In this example, a horizontal sync pulse output terminal of deflection circuit 18 is coupled to a direct current (DC) component reproduction terminal of demodulator 12 through a series circuit of resistor R1 and coil L, which constitute phase shifter 22, and capacitor C1. The DC component reproduction terminal is grounded through resistor R2. The node between resistor R1 and coil L is grounded through capacitor C2, while the node between coil L and capacitor C1 is grounded through capacitor C3.

Capacitors C2 and C3 in cooperation with coil L delay the phase of horizontal sync pulse HP from deflection circuit 18, thereby producing clamp pulse CP which is in phase with the color burst. In other words, clamp pulse CP is generated by clamp pulse generating means which comprises deflection circuit 18 and phase shifter 22.

A vertical blanking pulse output terminal of deflection circuit 18 is coupled to demodulator 12 and the base of transistor Q1 constituting switching circuit 24. Transistor Q1 has its emitter grounded and collector coupled to the node of coil L and resistor R1 of phase shifter 22.

When vertical blanking pulse VP (FIG. 2D) applied to the base of transistor Q1 is "H" (high), the collector and emitter of transistor Q1 are short-circuited. This causes phase shifter 22 to stop out-putting clamp pulse CP while pulse VP is "H" even if horizontal sync pulse HP is input. On the other hand, when pulse VP is "L" (low), the collector and emitter of transistor Q1 are not short-circuited. Therefore, when pulse HP is input, phase shifter 22 outputs clamp pulse CP. In other words, switching circuit 24 operates as control means for controlling the supply of clamp pulse CP From the clamp pulse generating means, which comprises deflection circuit 18 and phase shifter 22, to demodulator 12.

According to the monitor TV apparatus with the above arrangement, during the period in which vertical blanking pulse VP is "H" and which includes the period where switching pulse P is generated, even when horizontal sync pulse HP serving to produce clamp pulse CP is input to phase shifter 22, the collector and emitter of transistor Q1 is short-circuited so as to inhibit phase shifter 22 from outputting clamp pulse CP to demodulator 12. Therefore, when switching pulse P is in phase with clamp pulse CP, the output of demodulator 12 is a primary color signal f containing no sag, as is shown in FIG. 2F. This prevents a brightness change from occurring at the upper portion of the display screen.

During the vertical blanking period where vertical blanking pulse VP is "H," the pedestal level may vary by stopping the pedestal clamping operation. However, the change in the pedestal level may be reduced to a practically negligible level by making the time constants of the resistor and capacitor constituting the DC reproduction circuit provided in demodulator 12 sufficiently large.

FIG. 4 illustrates another arrangement of phase shifter/switching circuit 20. In this modification, the vertical blanking pulse output terminal of deflection circuit 18 is coupled to trigger input terminal A of one-shot multivibrator 28 of switching circuit 26 as well as to demodulator 12. One-shot multivibrator 28 has its inverting output terminal $\bar{Q}$ coupled to one input terminal of a two-input NAND gate 30. The other input terminal of NAND gate 30 is coupled to the vertical blanking pulse output terminal of deflection circuit 18. NAND gate 30 has its output terminal coupled to one input terminal of a two-input AND gate 32, whose other input terminal is coupled to the horizontal sync pulse output terminal of deflection circuit 18. AND gate 32 has its output terminal coupled to one end of resistor R1 of phase shifter 22, which has the same arrangement as the one shown in FIG. 3 and constitutes clamp pulse generating means together with deflection circuit 18.

With the above structure, one-shot multivibrator 28 outputs a pulse (FIG. 5B) from output terminal Q, which is set by a capacitor c and a resistor r and outputs an inverted pulse IP (FIG. 5C) from inverting output terminal $\bar{Q}$. This pulse IP and vertical blanking pulse VP (FIG. 5A) are supplied to NAND gate 30, thereby providing a gate pulse GP (FIG. 5D). This gate pulse GP is supplied to one input of AND gate 32 to control the opening/closing of the gate. That is, gate pulse GP controls the supply of horizontal sync pulse HP (FIG. 5E), applied to the other input terminal of AND gate 32, to phase shifter 22 for generation of the clamp pulse CP (FIG. 5F). Therefore, switching circuit 26 generates as control means for controlling the supply of clamp pulse CP from the clamp pulse generating means, which comprises deflection circuit 18 and phase shifter 22, to demodulator 12.

The width (denoted by t in FIG. 5B) of the pulse from output terminal Q of multivibrator 28, which is determined by capacitor c and resistor r, is set shorter than the period in which vertical blanking pulse VP shown in FIG. 5A is output. Further, the timing for the falling of gate pulse GP is set to be prior to the timing for outputting switching pulse P shown in FIG. 5G. Therefore, although the period in which gate pulse GP is formed through NAND gate 30 includes the period in which switching pulse P is output, it is set smaller than the period in which vertical blanking pulse VP is output.

With the above structure of phase shifter/switching circuit 20, since the period for stopping the output of clamp pulse CP is shorter than the one given by the phase shifter/switching circuit shown in FIG. 3, a change in pedestal level can be suppressed.

If switching circuit 26 of FIG. 4 is provided on that side where clamp pulse CP is output, the same effects would be attained.

The present invention can apply to a monochromatic monitor TV apparatus as well as a color type.

As described above, the monitor TV apparatus of this invention is provided with a circuit for stopping the pedestal clamping operation while at least the switching pulse is output for antenna switching. Accordingly, when the switching pulse is in phase with the clamp pulse, no sag would appear in the demodulation output, thus preventing a brightness change from occurring at the upper portion of the display screen.

What is claimed is:

1. A monitor television apparatus comprising:
    clamp pulse generating means for receiving a composite video signal from a television tuner that performs diversity reception and for generating a clamp pulse used for clamping of the pedestal level of said composite video signal, said diversity reception being such that a plurality of antennas are switched by a switching pulse produced in each vertical blanking period to select that antenna which maximizes said level of an input television signal;
    signal processing means for receiving said composite video signal and said clamp pulse, for demodulating said composite video signal, and for pedestal-clamping said demodulated video signal using said clamp pulse to reproduce a direct current component, thereby providing a predetermined video signal;
    display means for receiving and displaying said predetermined video signal as a video image; and
    control means for controlling the supply of said clamp pulse from said clamp pulse generating means to said processing means, said control means stopping the supply of said clamp pulse while said switching pulse is being output.

2. The monitor television apparatus according to claim 1, wherein said control means causes said clamp pulse generating means to stop generating said clamp pulse during said vertical blanking period.

3. The monitor television apparatus according to claim 2, wherein said clamp pulse generating means includes deflection circuit means for separating sync signals from said input composite video signal to produce a horizontal sync pulse and a vertical blanking pulse, and phase shifter means for receiving said horizontal sync pulse from said deflection circuit means and delaying a phase of said received horizontal sync pulse to produce said clamp pulse; and
    wherein said control means receives said vertical blanking pulse from said deflection circuit means and stops generation of said clamp pulse from said phase shifter means while receiving said vertical blanking pulse.

4. The monitor television apparatus according to claim 3, wherein said control means includes switching circuit means for stopping generation of said clamp pulse from said phase shifter means while receiving said vertical blanking pulse.

5. The monitor television apparatus according to claim 4, wherein said switching circuit means is an emitter-grounded transistor having a collector coupled to said phase shifter means and a base supplied with said vertical blanking pulse, said transistor being rendered conductive when said vertical blanking pulse is applied to said base, thereby preventing said clamp pulse from being output to said signal processing means from said phase shifter means.

6. The monitor television apparatus according to claim 5, wherein said phase shifter means includes a resistor and a coil coupled in series between said deflection circuit means and said signal processing means, a first capacitor coupled between a node of said resistor and said coil and a ground potential, and a second capacitor coupled between a node of said coil and said signal processing means and said ground potential; and
    wherein said collector of said transistor of said switching circuit means is coupled to said node of said resistor and said coil.

7. The monitor television apparatus according to claim 3, wherein said control means includes switching circuit means for stopping a supply of said horizontal sync pulse to said phase shifter means from said deflection circuit means while receiving said vertical blanking pulse.

8. The monitor television apparatus according to claim 7, wherein said switching circuit means includes gate pulse generating means for generating a gate pulse while at least said switching pulse is output, in response to said vertical blanking pulse from said deflection circuit means, and gate circuit means for receiving said horizontal sync pulse from said deflection circuit means and said gate pulse from said gate pulse generating means and stopping supply of said horizontal sync pulse to said phase shifter means upon receipt of said gate pulse.

9. The monitor television apparatus according to claim 8, wherein said gate pulse generating means includes pulse generating means for generating a pulse while receiving said vertical blanking pulse when a given time is elapsed after receipt of said vertical blanking pulse from said deflection circuit means, and NAND gate means for receiving said pulse from said pulse generating means and said vertical blanking pulse from said deflection circuit means, providing a logical product of said received pulse and said vertical blanking pulse and outputting a resultant signal as said gate pulse.

10. The monitor television apparatus according to claim 9, wherein said pulse generating means is a one-shot multivibrator means which outputs a "low" signal from an inverting output terminal thereof for said given time after receipt of said vertical blanking pulse from said deflection circuit means, and outputs a "high" signal while receiving said vertical blanking pulse when said given time is elapsed.

11. The monitor television apparatus according to claim 10, wherein said given time elapses before said switching pulse is output.

12. The monitor television apparatus according to claim 8, wherein said gate circuit means includes AND gate means for receiving said horizontal sync pulse from said deflection circuit means and said gate pulse from said gate pulse generating means, and stopping to output said horizontal sync pulse to said phase shifter circuit means upon receipt of said gate pulse by attaining a logical product of said horizontal sync pulse and said gate pulse.

13. A system for diversity-receiving a television signal, comprising:
  a plurality of antenna means;
  television tuner means, coupled to said plurality of antenna means, for performing diversity reception to provide a composite video signal, said television tuner means generating a switching pulse during each vertical blanking period, switching said plurality of antenna means in response to said switching pulse and selecting that antenna means which maximizes a level of an input signal, thereby receiving a television signal;
  clamp pulse generating means for receiving said composite video signal from said television tuner means and generating a clamp pulse used for clamping of the pedestal level of said composite video signal;
  signal processing means for receiving said composite video signal from said television tuner means and said clamp pulse from said clamp pulse generating means, for demodulating said composite video signal, and for pedestal-clamping said demodulated video signal using said clamp pulse to reproduce a direct current component, thereby providing a predetermined video signal;
  display means for receiving and displaying said predetermined video signal as a video image; and
  control means for controlling the supply of said clamp pulse from said clamp pulse generating means to said processing means, said control means stopping the supply of said clamp pulse while said switching pulse is being output.

14. The system according to claim 13, wherein said control means causes said clamp pulse generating means to stop generating said clamp pulse during said vertical blanking period.

15. The system according to claim 14, wherein said clamp pulse generating means includes deflection circuit means for separating sync signals from said composite video signal supplied from said television tuner means to produce a horizontal sync pulse, and a vertical blanking pulse, and phase shifter means for receiving said horizontal sync pulse from said deflection circuit means and delaying a phase of said received horizontal sync pulse to produce said clamp pulse; and
  wherein said control means receives said vertical blanking pulse from said deflection circuit means and stops generation of said clamp pulse from said phase shifter means while receiving said vertical blanking pulse.

16. The system according to claim 15, wherein said control means includes switching circuit means for stopping generation of said clamp pulse from said phase shifter means while receiving said vertical blanking pulse.

17. The system according to claim 15, wherein said control means includes switching circuit means for stopping a supply of said horizontal sync pulse to said phase shifter means from said deflection circuit means while receiving said vertical blanking means.

* * * * *